US010064115B2

(12) United States Patent
Henttonen et al.

(10) Patent No.: US 10,064,115 B2
(45) Date of Patent: Aug. 28, 2018

(54) METHOD AND APPARATUS FOR HANDOVER IN DUAL CONNECTIVITY USER EQUIPMENT AND BASE STATION

(71) Applicant: Nokia Solutions and Networks Oy, Espoo (FI)

(72) Inventors: Tero Henttonen, Espoo (FI); Claudio Rosa, Randers (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/128,737

(22) PCT Filed: Mar. 28, 2014

(86) PCT No.: PCT/EP2014/056311
§ 371 (c)(1),
(2) Date: Sep. 23, 2016

(87) PCT Pub. No.: WO2015/144240
PCT Pub. Date: Oct. 1, 2015

(65) Prior Publication Data
US 2017/0111841 A1    Apr. 20, 2017

(51) Int. Cl.
H04W 4/00 (2018.01)
H04W 36/00 (2009.01)
H04W 36/28 (2009.01)
H04W 76/04 (2009.01)
H04W 16/32 (2009.01)
H04W 76/27 (2018.01)

(52) U.S. Cl.
CPC ........... *H04W 36/28* (2013.01); *H04W 16/32* (2013.01); *H04W 76/046* (2013.01); *H04W 76/27* (2018.02)

(58) Field of Classification Search
None
See application file for complete search history.

(56) References Cited

U.S. PATENT DOCUMENTS

2016/0135103 A1* 5/2016 Lee ................... H04W 28/08
455/444

FOREIGN PATENT DOCUMENTS

WO    WO 2013/113405 A1    8/2013
WO       2013/143613 A1   10/2013

OTHER PUBLICATIONS

"New Work Item Description: Dual Connectivity for LTE", 3GPP TSG-RAN Meeting #62, RP-132069, Agenda Item: 13.1.2, Ntt Docomo, Dec. 3-6, 2013, 7 pages.
"3rd Generation Partnership Project; Technical Specification Group Radio Access Network; Study on Small Cell enhancements for E-UTRA and E-UTRAN; Higher layer aspects(Release 12)", 3GPP TR 36.842, V12.0.0, Dec. 2013, pp. 1-71.

(Continued)

*Primary Examiner* — Erika Washington
(74) *Attorney, Agent, or Firm* — Squire Patton Boggs (US) LLP

(57) ABSTRACT

A method comprises, responsive to a first base station of a user equipment changing, causing measurement information of one or more cells of one or more second base stations made by said user equipment to be stored; and causing said stored measurement information to be provided to a third base station.

14 Claims, 4 Drawing Sheets

(56) References Cited

OTHER PUBLICATIONS

"Method to Use SCG during MCG handover for Dual Connectivity", 3GPP TSG-RAN WG2 Meeting #85, R2-140530, Agenda item: 7.2.2, Broadcom Corporation, Feb. 10-14, 2014, 6 pages.
"Consideration of MCG Hanover for Dual Connectivity", 3GPP TSG RAN WG2#85, R2-140189, Agenda Item: 7.2.1, CATT, Feb. 10-14, 2014, pp. 1-4.
"Reply LS on Security Aspects of Protocol Architectures for Small Cell Enhancements", 3GPP TSG RAN WG2 Meeting #85, R2-140813, Feb. 10-14, 2014, 2 pages.
"3rd Generation Partnership Project;Technical Specification Group Radio Access Network;Evolved Universal Terrestrial Radio Access (E-UTRA);Requirements for support of radio resource management(Release 12)", 3GPP TS 36.133, V12.2.0, Dec. 2013, pp. 01-815.
"3rd Generation Partnership Project; Technical Specification Group Radio Access Network; Evolved Universal Terrestrial Radio Access (E-UTRA); Physical layer procedures (Release 12)", 3GPP TS 36.213, V12.0.0, Dec. 2013, pp. 1-186.
"Report of the LTE UP Ad Hoc Meeting", 3GPP TSG RAN WG2 #85, R2-140900, Agenda Item: 12.1, Feb. 10-14, pp. 1-12.
International Search Report and Written Opinion received for corresponding Patent Cooperation Treaty Application No. PCT/EP2014/056311, dated Jan. 22, 2015, 13 pages.
"MCG Handover for Dual Connectivity", 3GPP TSG-RAN WG2 Meeting #85, R2-140531, Agenda item: 7.2.1, Broadcom Corporation, Feb. 10-14, 2014, 8 pages.
"Mobility Procedures for Dual Connectivity", 3GPP TSG-RAN WG2 #85, Tdoc R2-140642, Agenda Item: 7.2.1, Ericsson, Feb. 10-14, 2014, pp. 1-4.
Ofice action received for corresponding Japanese Patent Application No. 2017-501470, dated Jan. 9, 2018, 2 pages of office action and 2 pages of translation available.
"Optimization on Intra-eNB Pcell Change Procedure", 3GPP TSG-RAN Working Group 2 meeting #71, R2-104421, Agenda: 7.1.1.4, Media Tek Inc, Aug. 23-27, 2010, pp. 1-4.
"C-plane Procedure for Addition/Removal of SCells in SeNB", 3GPP TSG-RAN Working Group 2 meeting #84, R2-134082, Agenda: 7.2.2.1, KDDI Corporation, Nov. 11-15, 2013, 3 pages.
Notice of Reasons for Rejection (Non-Final) dated Jun. 11, 2018 corresponding to Japanese Patent Application No. 2017-501470.

\* cited by examiner

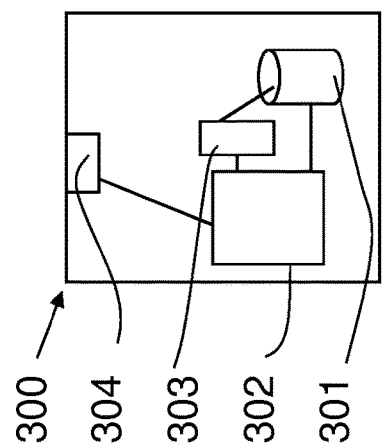
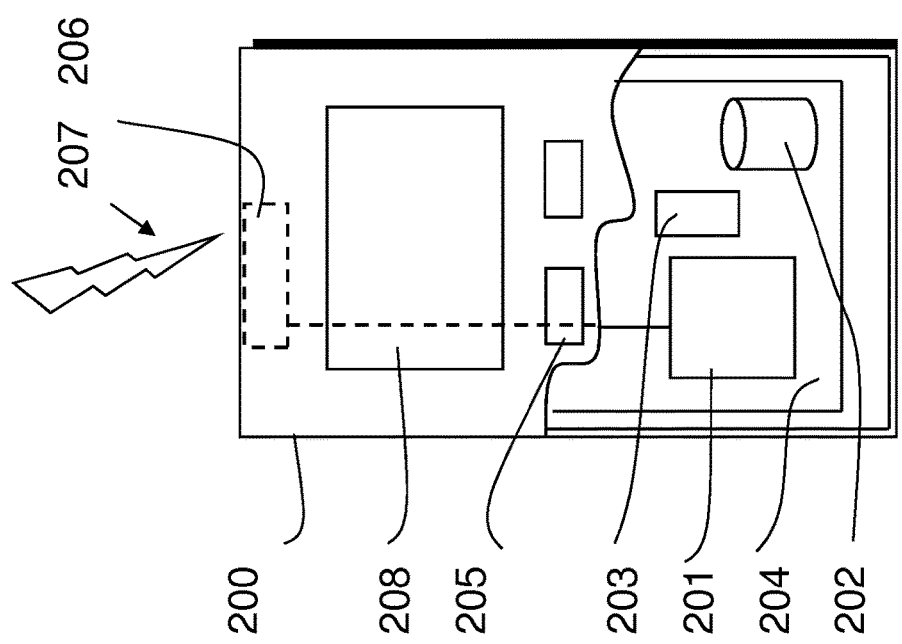

METHOD AND APPARATUS FOR HANDOVER IN DUAL CONNECTIVITY USER EQUIPMENT AND BASE STATION

RELATED APPLICATION

This application was originally filed as PCT Application No. PCT/EP2014/056311 filed Mar. 28, 2014.

Some embodiments relate to a method and apparatus and in particular but not exclusively to a method and apparatus for use in scenarios where a user device or equipment is in communication with two or more nodes or base stations.

A communication system can be seen as a facility that enables communication sessions between two or more nodes such as fixed or mobile communication devices, access points such as nodes, base stations, servers, hosts, machine type servers, routers, and so on. A communication system and compatible communicating devices typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the devices and functionalities thereof shall be configured.

It should be understood that conveying, broadcasting, signalling, transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to the terms transmission and reception as well.

A user can access the communication system by means of an appropriate communication device. A communication device of a user is often referred to as user equipment (UE), user device or terminal.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, such systems being often referred to as cellular systems. A cell can be provided by a base station, there being various different types of base stations. Different types of cells can provide different features. For example, cells can have different shapes, sizes, functionalities and other characteristics. A cell is typically controlled by a control node.

A communication device is provided with an appropriate signal receiving and transmitting arrangement for enabling communications with other parties. In wireless systems a communication device typically provides a transceiver station that can communicate with another communication device such as e.g. a base station and/or another user equipment. A communication device such as a user equipment (UE) may access a carrier provided by a base station, and transmit and/or receive on the carrier.

An example of cellular communication systems is an architecture that is being standardized by the 3rd Generation Partnership Project (3GPP). A recent development in this field is often referred to as the long-term evolution (LTE) or long-term evolution advanced (LTE advanced) of the Universal Mobile Telecommunications System (UMTS) radio-access technology. In LTE base stations providing the cells are commonly referred to as enhanced NodeBs (eNB). An eNB can provide coverage for an entire cell or similar radio service area.

Cells can provide different service areas. For example, some cells may provide wide coverage areas while some other cells provide smaller coverage areas. The smaller radio coverage areas can be located wholly or partially within a larger radio coverage area. For example, in LTE a node providing a relatively wide coverage area is referred to as a macro eNode B. Examples of nodes providing smaller cells, or local radio service areas, include femto nodes such as Home eNBs (HeNB), pico nodes such as pico eNodeBs (pico-eNB) and remote radio heads.

A device may communicate with more than one cell. Communications with more than one cell may be provided e.g. to increase performance. Dual connectivity may be provided where a user device is configured to communicate both with a master eNB (MeNB) and a secondary eNB (SeNB).

According to an aspect, there is provided a method comprising: responsive to a first base station of a user equipment changing, causing measurement information of one or more cells of one or more second base stations made by said user equipment to be stored; and causing said stored measurement information to be provided to a third base station.

The user equipment may be connected to at least one cell of the first base station and at least one cell of at least one second base station before first base station changes.

The user equipment may be in a dual connectivity mode.

The first base station may comprise a master base station.

The one or more second base stations may comprise one or more secondary base stations.

The third base station may comprise a new master base station.

The said first base station may comprise a master base station, said one or more second base stations comprise one or more secondary base stations and said third base station comprises a new master base station.

The method may comprise receiving information indicating that said first base station is to change.

The information indicating that said first base station is to change may comprise a radio resource control reconfiguration message.

The method may comprise receiving information indicating for which one or more cells of said one or more second base stations measurement information is to be stored.

The information indicating for which one or more cells of said one or more second base stations measurement information is to be stored is received in a handover command.

The measurement information may comprise one or more of reference signal received power, reference signal received quality and channel quality information.

The method may comprise causing said stored measurement information to be provided to said third base station in one of a radio resource control message, a connection reconfiguration complete message and a radio resource control connection reconfiguration complete message.

The method may be performed by an apparatus in a user equipment.

According to another aspect, there is provided a method comprising: causing a handover request for a user equipment to be sent from a first base station which is to change to a third base station, said handover request comprising information indicating that said user equipment is operating in a dual connectivity mode.

The method may be performed in an apparatus of a first base station

According to another aspect, there is provided a method comprising: receiving a handover request for a user equipment at a third base station, said user equipment to be handed over from a first base station to said third base station, said handover request comprising information indicating that said user equipment is operating in a dual connectivity mode.

The method may be performed in an apparatus of a third base station

According to another aspect, there is provided a method comprising: receiving at a first base station of a user equipment, which is to be handed over to a third base station, at least one message from said third base station, said at least one message comprising information to cause said user equipment to at least one of store measurement information of one or more cells of one or more second base stations made by said user equipment and to transmit said stored measurement information.

The method may be performed in an apparatus of a first base station

According to another aspect, there is provided a method comprising: causing at least one message to be transmitted from a third base station to a first base station, a user equipment to be handed over from the first base station to the third base station, said at least one message comprising information to cause said user equipment to at least one of store measurement information of one or more cells of one or more second base stations made by said user equipment and to transmit said stored measurement information.

The method may be performed in an apparatus of a third base station.

According to another aspect, there is provided a method comprising: receiving in a third base station measurement information from a user equipment, said user equipment providing said information responsive to said user equipment being handed over from a first base station to said third base station, said measurement information being of one or more cells of one or more second base stations made by said user equipment.

The user equipment may be connected to at least one cell of the first base station and at least one cell of at least one second base station before first base station changes.

The user equipment may be in a dual connectivity mode.

The first base station may comprise a master base station.

The one or more second base stations may comprise one or more secondary base stations.

The third base station may comprise a new master base station.

The said first base station may comprise a master base station, said one or more second base stations comprise one or more secondary base stations and said third base station comprises a new master base station.

The measurement information may comprise one or more of reference signal received power, reference signal received quality and channel quality information.

The method may comprise receiving said stored measurement information in
one of a radio resource control message, a connection reconfiguration complete message and a radio resource control connection reconfiguration complete message.

The method may be performed in an apparatus of a third base station

According to an aspect, there is provided an apparatus in a user equipment comprising: means for storing, responsive to a first base station of a user equipment changing, measurement information of one or more cells of one or more second base stations made by said user equipment; and means for causing said stored measurement information to be provided to a third base station.

The user equipment may be connected to at least one cell of the first base station and at least one cell of at least one second base station before first base station changes.

The user equipment may be in a dual connectivity mode.

The first base station may comprise a master base station.

The one or more second base stations may comprise one or more secondary base stations.

The third base station may comprise a new master base station.

The said first base station may comprise a master base station, said one or more second base stations comprise one or more secondary base stations and said third base station comprises a new master base station.

The apparatus may comprise means for receiving information indicating that said first base station is to change.

The information indicating that said first base station is to change comprises a radio resource control reconfiguration message.

The apparatus may comprise means for receiving information indicating for which one or more cells of said one or more second base stations measurement information is to be stored.

The information indicating for which one or more cells of said one or more second base stations measurement information is to be stored may be received in a handover command.

The measurement information may comprise one or more of reference signal received power, reference signal received quality and channel quality information.

The causing means may cause said stored measurement information to be provided to said third base station in one of a radio resource control message, a connection reconfiguration complete message and a radio resource control connection reconfiguration complete message.

According to another aspect, there is provided an apparatus in a first base station comprising: means for causing a handover request for a user equipment to be sent from said first base station which is to change to a third base station, said handover request comprising information indicating that said user equipment is operating in a dual connectivity mode.

According to another aspect, there is provided an apparatus in a third base station comprising: means for receiving a handover request for a user equipment, said user equipment to be handed over from a first base station to said third base station, said handover request comprising information indicating that said user equipment is operating in a dual connectivity mode.

According to another aspect, there is provided an apparatus in a first base station comprising: means for receiving at least one message from a third base station, a user equipment being handed over from said first base station to said third base station, said at least one message comprising information to cause said user equipment to at least one of store measurement information of one or more cells of one or more second base stations made by said user equipment and transmit said stored measurement information.

According to another aspect, there is provided an apparatus in a third base station comprising: means for causing at least one message to be transmitted to a first base station, a user equipment to be handed over from the first base station to the third base station, said at least one message comprising information to cause said user equipment to at least one of store measurement information of one or more cells of one or more second base stations made by said user equipment and transmit said stored measurement information.

According to another aspect, there is provided an apparatus in a third base station comprising: means for receiving measurement information from a user equipment, said user equipment providing said information responsive to said user equipment being handed over from a first base station to said third base station, said measurement information being of one or more cells of one or more second base stations made by said user equipment.

The user equipment may be connected to at least one cell of the first base station and at least one cell of at least one second base station before first base station changes.

The user equipment may be in a dual connectivity mode.

The first base station may comprise a master base station.

The one or more second base stations may comprise one or more secondary base stations.

The third base station may comprise a new master base station.

The said first base station may comprise a master base station, said one or more second base stations comprise one or more secondary base stations and said third base station comprises a new master base station.

The measurement information may comprise one or more of reference signal received power, reference signal received quality and channel quality information.

The stored measurement information may be received in one of a radio resource control message, a connection reconfiguration complete message and a radio resource control connection reconfiguration complete message.

According to another aspect, there is provided an apparatus in a user equipment, said apparatus comprising at least one processor and at least one memory including computer code for one or more programs, the at least one memory and the computer code configured, with the at least one processor, to cause the apparatus at least to store, responsive to a first base station of a user equipment changing, measurement information of one or more cells of one or more second base stations made by said user equipment; and cause said stored measurement information to be provided to a third base station.

The user equipment may be connected to at least one cell of the first base station and at least one cell of at least one second base station before first base station changes.

The user equipment may be in a dual connectivity mode.

The first base station may comprise a master base station.

The one or more second base stations may comprise one or more secondary base stations.

The third base station may comprise a new master base station.

The said first base station may comprise a master base station, said one or more second base stations comprise one or more secondary base stations and said third base station comprises a new master base station.

The at least one memory and the computer code may be configured, with the at least one processor to receive information indicating that said first base station is to change.

The information indicating that said first base station is to change comprises a radio resource control reconfiguration message.

The at least one memory and the computer code may be configured, with the at least one processor to receive information indicating for which one or more cells of said one or more second base stations measurement information is to be stored.

The information indicating for which one or more cells of said one or more second base stations measurement information is to be stored may be received in a handover command.

The measurement information may comprise one or more of reference signal received power, reference signal received quality and channel quality information.

The at least one memory and the computer code may be configured, with the at least one processor to cause said stored measurement information to be provided to said third base station in one of a radio resource control message, a connection reconfiguration complete message and a radio resource control connection reconfiguration complete message.

According to another aspect, there is provided an apparatus in a first base station said apparatus comprising at least one processor and at least one memory including computer code for one or more programs, the at least one memory and the computer code configured, with the at least one processor, to cause the apparatus at least to: cause a handover request for a user equipment to be sent from said first base station which is to change to a third base station, said handover request comprising information indicating that said user equipment is operating in a dual connectivity mode.

According to another aspect, there is provided an apparatus in a third base station said apparatus comprising at least one processor and at least one memory including computer code for one or more programs, the at least one memory and the computer code configured, with the at least one processor, to cause the apparatus at least to: receive a handover request for a user equipment, said user equipment to be handed over from a first base station to said third base station, said handover request comprising information indicating that said user equipment is operating in a dual connectivity mode.

According to another aspect, there is provided an apparatus in a first base station said apparatus comprising at least one processor and at least one memory including computer code for one or more programs, the at least one memory and the computer code configured, with the at least one processor, to cause the apparatus at least to: receive at least one message from a third base station, a user equipment being handed over from said first base station to said third base station, said at least one message comprising information to cause said user equipment to at least one of store measurement information of one or more cells of one or more second base stations made by said user equipment and transmit said stored measurement information.

According to another aspect, there is provided an apparatus in a third base station said apparatus comprising at least one processor and at least one memory including computer code for one or more programs, the at least one memory and the computer code configured, with the at least one processor, to cause the apparatus at least to: cause at least one message to be transmitted to a first base station, a user equipment to be handed over from the first base station to the third base station, said at least one message comprising information to cause said user equipment to at least one of store measurement information of one or more cells of one or more second base stations made by said user equipment and transmit said stored measurement information.

According to another aspect, there is provided an apparatus in a third base station said apparatus comprising at least one processor and at least one memory including computer code for one or more programs, the at least one memory and the computer code configured, with the at least one processor, to cause the apparatus at least to: receive measurement information from a user equipment, said user equipment providing said information responsive to said user equipment being handed over from a first base station to said third base station, said measurement information being of one or more cells of one or more second base stations made by said user equipment.

The user equipment may be connected to at least one cell of the first base station and at least one cell of at least one second base station before first base station changes.

The user equipment may be in a dual connectivity mode.

The first base station may comprise a master base station.

The one or more second base stations may comprise one or more secondary base stations.

The third base station may comprise a new master base station.

The said first base station may comprise a master base station, said one or more second base stations comprise one or more secondary base stations and said third base station comprises a new master base station.

The measurement information may comprise one or more of reference signal received power, reference signal received quality and channel quality information.

The stored measurement information may be received in one of a radio resource control message, a connection reconfiguration complete message and a radio resource control connection reconfiguration complete message.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

Some embodiments will now be described, by way of example only, with respect to the following Figures in which:

FIG. 2 shows a schematic diagram of a mobile communication device according to some embodiments;

FIG. 3 shows a schematic diagram of a control apparatus according to some embodiments;

Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively).

Figure 1:
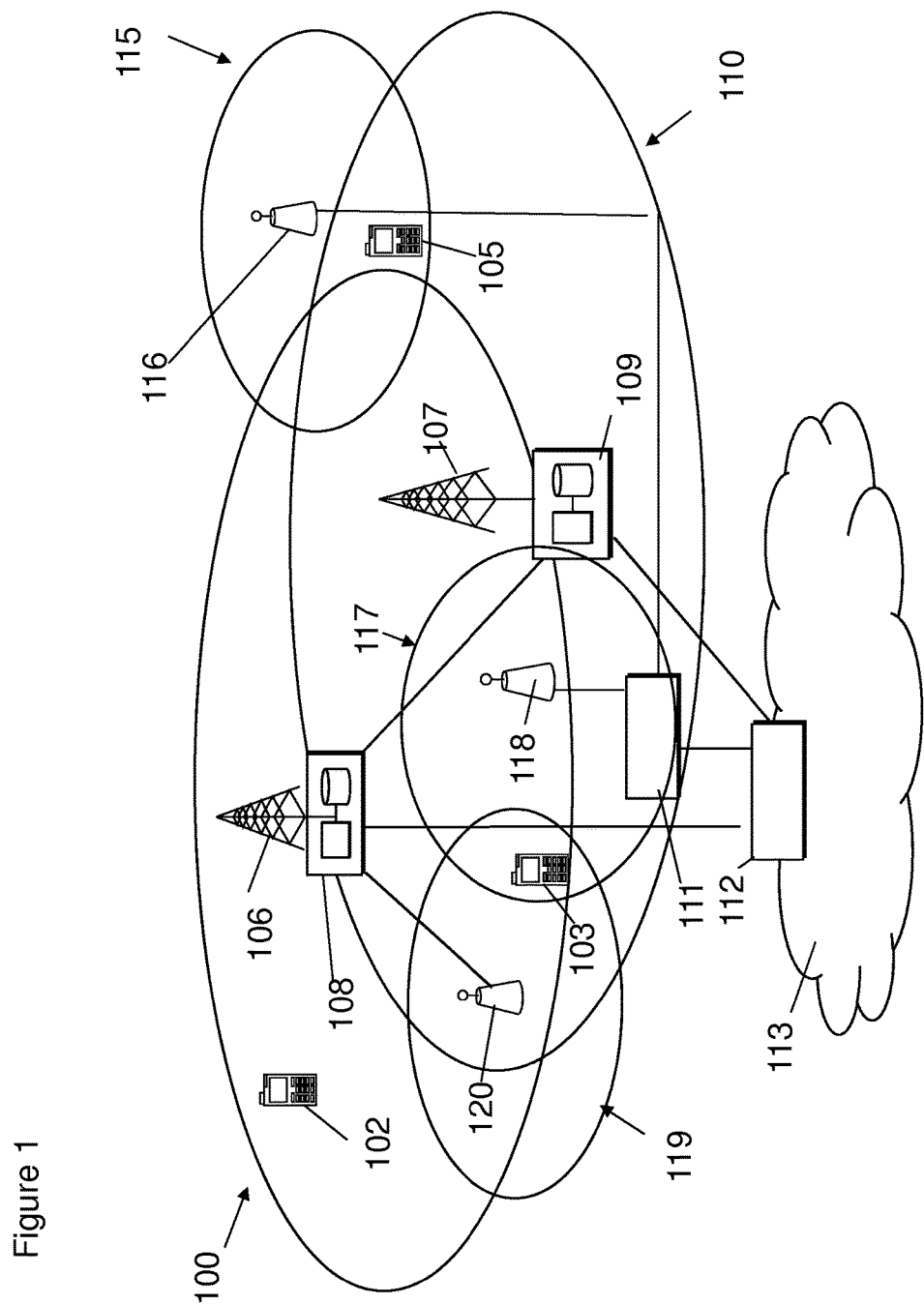
FIG. 1 shows a schematic diagram of a network according to some embodiments.

In FIG. 1 base stations 106 and 107 are shown as connected to a wider communications network 113 via gateway 112. A further gateway function may be provided to connect to another network. These may be macro base stations.

The smaller base stations 116, 118 and 120 may also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided. The smaller base stations may provide a femto cell, a pico cell, a micro cell, and/or the like.

A possible communication device will now be described in more detail with reference to FIG. 2 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like.

The device 102 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs). Other examples of radio access system include those provided by base stations of systems that are based on technologies such as wireless local area network (WLAN) and/or WiMax (Worldwide Interoperability for Microwave Access).

FIG. 3 shows an example of a control apparatus 300. This control apparatus may be provided in one or more of a base station, a MME or any other suitable entity. The control apparatus can be configured to provide control functions. For this purpose the control apparatus comprises at least one memory 301, at least one data processing unit 302, 303 and an input/output interface 304. Via the interface the control apparatus can be coupled to receive and/or provide data. The control apparatus 114 can be configured to execute an appropriate software code to provide the control functions.

Base stations may communicate via each other via fixed line connection and/or air interface.

Figure 5:
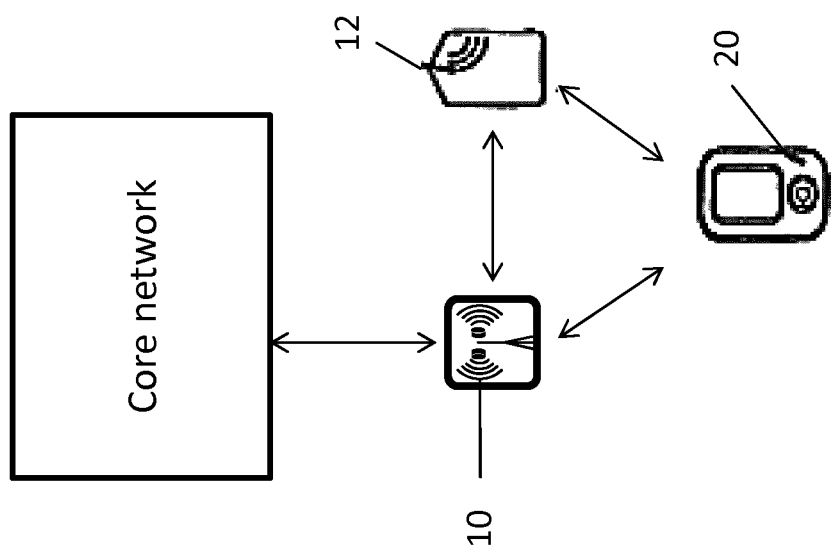
FIG. 5 illustrates the principle of dual connectivity.

FIG. 5 shows an example for dual connectivity where a UE 20 is connected to a master eNB 10 and a secondary eNB 12 simultaneously. The master eNB 10 is in communication with the core network. The secondary eNB is in communication with the core network via the master eNB 10 or may communicate with the core network directly . . . . For User plane option 1A the SeNB may not have a connection to the MME (S1-MME) but it has a connection to the S-GW (S1-U). In user plane option 3C, he SeNB is not in direct communication with the core network. Also, for dual connectivity the master and secondary eNB communicate via an interface (X2).

Some embodiments may relate to dual connectivity of UE. Some embodiments will be described in the context of LTE. It should however be appreciated that some embodiments may be used in the context of other, non LTE systems.

In some embodiments, dual connectivity may enable more flexible resource utilization across eNBs. In dual connectivity, a UE is simultaneously connected to both the Master eNB (MeNB) and a Secondary eNB (SeNB). The MeNB and SeNB may be connected via a non-ideal backhaul link with transmission delays in the range of for example ~20 ms. Some embodiments may address MeNB mobility when SeNB is configured.

It has been suggested to allow one UE to remain connected to one SeNB during the handover HO procedure. However this may require modifications to the X2-based HO procedure.

It has been suggested that an HO procedure that releases dual connectivity before handing over the corresponding UE to the target eNB may be provided. It is then up to the target eNB to decide whether or not to configure dual connectivity with the original (source) SeNB or with any other suitable eNB. With this, the source MeNB does not provide any information to the target MeNB about the SeNB that was configured to the UE before the HO procedure. Therefore the target eNB will have to use the standardized SeNB addition procedure triggered by a measurement report from the UE to re-establish dual connectivity with the originally configured SeNB. Depending on the UE implementation, there may be some time after a handover before a UE starts sending measurement reports to the serving cell, to indicate that that certain cell(s) fulfill the configured reporting criteria for the corresponding measurement object (i.e. frequency/cell). Therefore re-establishment of dual connectivity with an originally configured SeNB used before HO may be delayed, thus resulting in a potential performance loss.

In some scenarios, even with a low number of small cells per macro cell area, if the small cell and macro cell layers are deployed on different frequency layers the probability of a MeNB handover being triggered when the UE is in dual connectivity between a macro and a small cell may be relatively high.

One option is to provide a modified HO procedure that can maintain dual connectivity configuration during handover procedure. However, these options may be relatively complex and require too many changes to the legacy X2 handover procedure for application in some situations.

Another option is that the source MeNB provides the target (M)eNB with information about the SeNB that was configured to the UE before handover. For handover purposes, the source MeNB decides on handovers. Since the target eNB may not be capable of dual connectivity, it may not be a MeNB. Accordingly, the target eNB is referenced (M)eNB indicating that if the target eNB supports dual connectivity, the target eNB will be a MeNB if dual connectivity can be resumed after handover. Otherwise the target eNB is simply an eNB.

The target (M)eNB can then start the SeNB addition procedure with the originally configured SeNB before receiving any measurement report from the UE. The SeNB addition procedure over X2 could be started even before the HO procedure is concluded. This may speed up the re-establishment of dual connectivity after HO. However, the target (M)eNB initiates the SeNB addition procedure without knowing the received signal quality/strength by the UE from the corresponding SeNB. If the received signal quality/strength varies during the HO procedure or the information from the source MeNB is based on old UE measurement reports, the SeNB addition procedure might be unnecessarily triggered and the SeNB might not be usable by the UE.

Some embodiments may reduce the time for the (target) (M)eNB to re-establish dual connectivity between the UE and a previously configured SeNB after handover occurs.

In some embodiments, when the UE configured with dual connectivity receives a HO command, the UE stores the current measurement result and later sends a measurement report (with e.g. RSRP (reference signal received power) and/or RSRQ (reference signal received quality)) of at least one of the previously configured SCG cells. The handover command may be a RRC (radio resource control) reconfiguration message including mobility control information. The mobility control information may be provided by the mobility control information IE (information element). The measurement report may be sent, for example at the first PUSCH (physical uplink shared channel) transmission opportunity towards the target (M)eNB.

When configured with dual connectivity, the UE performs measurements of the received signal quality and/or strength on at least one SCG cell, the last available measurements on such at least one SCG cell could be the one that it is stored and then transmitted to the target (M)eNB.

The target (M)eNB may indicate whether it requests immediate measurement report(s) for at least one of the previously configured SCG cells when sending the HO command to the source eNB.

Figure 4:
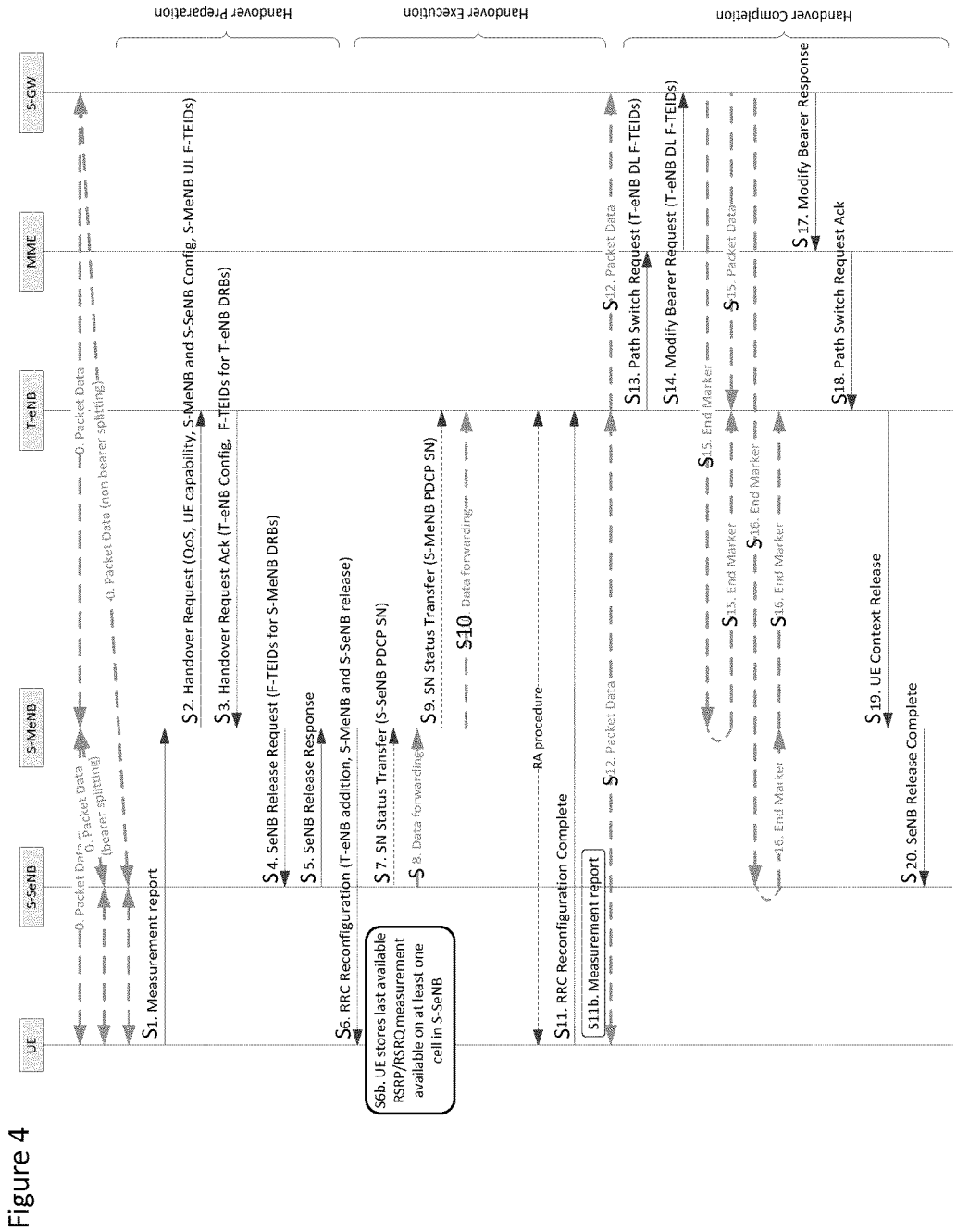
FIG. 4 is a signalling diagram according to an embodiment.

Upon receiving such measurement report, the (target) (M)eNB may decide whether to start SeNB addition procedure with the corresponding SeNB indicated by the measurement report. An example of a signalling flow of an embodiment is shown in FIG. 4. It should be appreciated that the signalling flow diagram shows one example of a HO procedure. However, in other embodiments, a different HO procedure may be used.

Initially packet data is transferred between the S-GW and the UE by passing through S-MeNB (Source MeNB), and/or S-SeNB (Source SeNB) depending on the dual connectivity user plane option. This is represented by the dotted lines at the top of the signalling flow diagram.

In step S1, a measurement report is triggered by the UE and is sent to the S-MeNB.

In step S2, the S-MeNB sends the handover request message to the T-eNB (Target eNB). This will be the serving eNB for the UE after the handover, which will become a new MeNB for the UE if dual connectivity is again configured after handover. The handover request message may optionally include an indication that the UE in question had dual connectivity configured prior to the handover. The handover request may comprise one or more of quality of service QoS information, UE capability information, S-MeNB and/or S-SeNB configuration information, one or more of S-MeNBs Fully Qualified Tunnel Endpoint Identifiers (F-TEIDs).

In step S3, the T-eNB responds with a handover request acknowledgement message to the S-MeNB. The handover request acknowledgement message may optionally indicate one, for example within the HO command addressed to the UE, whether the UE should store and send the measurement report to the T-eNB after handover is completed. In some embodiments may include an explicit or implicit indication of which cells should be reported. Optionally this message may indicate with which message identity the cells should be reported. The message may include configuration information for the T-eNB and/or F-TEIDs for downlink DRBs (data radio bearers). In some embodiments the specific message identity may be implicitly (e.g. fixed in specification to be a specific value) or explicitly (e.g. configured in the message) indicated to the UE, to use as the message identity when the report is sent after the handover.

In step S4, the S-MeNB sends a SeNB Release Request message to the S-SeNB. This may comprise the F-TEIDs for the S-MeNB DRBs.

In step S5, the S-SeNB responds with SeNB release response message to the S-MeNB. In this step, the UE content is still retained in S-SeNB until the S-SeNB receives the SeNB release complete message (step S20).

In step S6, the S-MeNB sends a RRC message received from the T-eNB to perform the handover to the UE. The message may be a RRC connection reconfiguration message indicating that the T-eNB is added, whilst the S-SeNB and S-MeNB are released. The message can be any other RRC message or non RRC message.

In step S6b, the UE stores a measurement result of the received signal quality and/or strength of at least one of the previously configured cells in the S-SeNB. This may be implicitly determined as the cell(s) with the PUCCH (physical uplink control channel) or may be explicitly indicated via the HO command.

Steps S7 to S10 may prevent data loss during handover.

In step S7, the S-SeNB may send a SN (sequence number) status transfer message to the S-MeNB. This may include the uplink PDCP (packet data convergence protocol) SN and HFN (hyper frame number) receiver status and/or the downlink PDCP SN and HFN transmitter status of S-SeNB. This procedure may occur only for non bearer splitting.

In step S8, the S-SeNB may perform data forwarding to S-MeNB. This procedure occurs only for non bearer splitting.

In step S9, the S-MeNB may send the SN status transfer message (including the uplink PDCP SN and HFN receiver status and/or the downlink PDCP SN and HFN transmitter status of S-MeNB) to the T-eNB.

In step S10, the S-MeNB may perform data forwarding to T-eNB. The T-eNB buffers forwarded packets from S-MeNB until it receives a RRC connection reconfiguration complete message.

After receiving the RRC connection reconfiguration message indicating that the T-NB is added and the S-MeNB and SeNB are released, the UE performs Random Access (RA) procedure towards the T-eNB and sends a RRC connection reconfiguration complete message to the T-eNB in step S11.

In step S11b, the UE sends a measurement report to the T-eNB indicating the received signal quality and/or strength on at least one of the previously configured cells in the S-SeNB. The message may be sent with a message identity that is configured to the UE implicitly or explicitly, or piggy-backed to an existing message such as RRC connection reconfiguration complete.

In step S12, packet data is transferred between the S-GW and the UE by passing through the T-eNB. DL packets from the S-GW will go through the T-eNB to the UE after the S-GW receives a modify bearer request message from the MME in step S14.

The T-eNB sends a path switch request message to the MME in step S13 to inform that the UE has changed SeNB. This message may include the T-eNB DL F-TEIDs with the S-GW.

In step S14, the MME sends a modify bearer request to the S-GW message. This message may include the T-SeNB DL F-TEIDs with the S-GW.

In step S15, the S-GW switches the downlink data path previously served by the S-MeNB to the target side. The S-GW may send one or more "end marker" packets on the old path to the S-MeNB and then can release any U-plane/TNL (tunnel) resources towards the S-MeNB. DL packets from the S-GW are sent through the T-eNB to the UE.

In step S16, the S-GW switches the downlink data path previously served by the S-SeNB to the target side. The S-GW may send one or more end marker packets on the old path to the S-SeNB and then can release any U-plane/TNL resources towards the S-SeNB. This procedure may occur only for non bearer splitting.

In step S17, the S-GW sends a modify bearer response message to the MME.

In step S18 the MME confirms the path switch request message with the path switch request acknowledge message.

By sending the UE Context Release message in step S19, the T-eNB informs success of handover to the S-MeNB and triggers the release of resources by the S-MeNB and S-SeNB.

In step S20 the S-MeNB sends the SeNB release complete message to the S-SeNB to release the radio resources for the UE at the S-SeNB.

It should be appreciated that whether the T-eNB can start the SeNB addition procedure just after receiving the measurement report from the UE in step S6b or if it has to wait the path switch procedure (steps S13-18) may be eNB implementation specific and/or depend on the dual connectivity user plane option.

In some embodiments, the measurement of the received signal quality and/or strength on at least one of the previously configured cells in the S-SeNB stored by the UE in step S6b and transmitted to the T-eNB in step S11b are the RSRQ and/or the RSRP.

In some embodiments, the measurement of the received signal quality on at least one of the previously configured cells in the S-SeNB stored by the UE in step S6b and transmitted to the T-eNB in step S11b is alternatively or additionally channel quality information (CQI).

In some embodiments, since the UE is continuously monitoring cells as per the measurement requirements, the UE may continue updating the measurement results stored in step S6b (based on performed radio measurements) before it reports the corresponding measurement report(s) to the target eNB in step S11b so that the reported measurement results may correspond to the latest available measurement results.

The at least one of the previously configured cells in the S-SeNB for which a measurement result of the received signal quality and/or strength is stored by the UE in step S6b and transmitted to the T-eNB in step S11b may be the cell carrying the PUCCH. The cell carrying the PUCCH may never be de-activated in some standards.

In some embodiments, the measurement report may be transmitted to the T-eNB simultaneously (i.e. in the same LTE subframe) with the RRC reconfiguration complete message in step S11.

In some embodiments, the UE may send an indication of the measurement report availability in step S11b instead of the actual measurement result. The eNB can then request the measurement value from the UE after receiving the indication.

Some embodiments may allow a faster dual connectivity re-establishment after HO, especially in case of dual connectivity user plane option 3C (split bearer).

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
   responsive to a first base station of a user equipment changing, causing measurement information of one or more cells of one or more second base stations made by said user equipment to be stored,
   wherein said user equipment is simultaneously connected to at least one cell of the first base station and the one or more cells of the one or more second base stations before the first base station changes; and
   causing said stored measurement information to be provided to a third base station at a first physical uplink shared channel transmission opportunity.

2. The method as claimed in claim 1, wherein said first base station comprises a master base station, said one or more second base stations comprise one or more secondary base stations, and said third base station comprises a new master base station.

3. The method as claimed in claim 1, further comprising:
   receiving information indicating that said first base station is to change.

4. The method as claimed in claim 3, wherein said information indicating that said first base station is to change comprises a radio resource control reconfiguration message.

5. The method as claimed in claim 1, further comprising:
   receiving information indicating for which one or more cells of said one or more second base stations measurement information is to be stored.

6. The method as claimed in claim 5, wherein said information indicating for which one or more cells of said one or more second base stations measurement information is to be stored is received in a handover command.

7. The method as claimed in claim 1, wherein said measurement information comprises one or more of reference signal received power, reference signal received quality and channel quality information.

8. The method as claimed in claim 1, further comprising:
   causing said stored measurement information to be provided to said third base station in at least one of a radio resource control message, a connection reconfiguration complete message, or a radio resource control connection reconfiguration complete message.

9. A method comprising:
   causing a message to be transmitted from a third base station to a first base station at a first physical uplink shared channel transmission opportunity, a user equipment to be handed over from the first base station to the third base station, said message comprising information to cause said user equipment to store measurement information of one or more cells of one or more second base stations made by said user equipment,
   wherein said user equipment is simultaneously connected to at least one cell of the first base station and the one or more cells of the one or more second base stations before the first base station changes.

10. An apparatus in a user equipment, said apparatus comprising:
    at least one processor; and
    at least one memory including computer code for one or more programs,
    wherein the at least one memory and the computer code are configured, with the at least one processor, to cause the apparatus at least to:
    store, responsive to a first base station of a user equipment changing, measurement information of one or more cells of one or more second base stations made by said user equipment, wherein said user equipment is simultaneously connected to at least one cell of the first base station and the one or more cells of the one or more second base stations before the first base station changes; and cause said stored measurement information to be provided by the user equipment to a third base station at a first physical uplink shared channel transmission opportunity.

11. The apparatus as claimed in claim 10, wherein the at least one memory and the computer code are also configured, with the at least one processor to receive information indicating that said first base station is to change.

12. The apparatus as claimed in claim 11, wherein the information indicating that said first base station is to change comprises a radio resource control reconfiguration message.

13. The apparatus as claimed in claim 11, wherein the at least one memory and the computer code are also configured, with the at least one processor to receive information indicating for which one or more cells of said one or more second base stations measurement information is to be stored.

14. The apparatus as claimed in claim 11, wherein the at least one memory and the computer code are configured, with the at least one processor to cause said stored measurement information to be provided to said third base station in a connection reconfiguration complete message.

* * * * *